United States Patent
Ahn et al.

(10) Patent No.: US 11,084,536 B2
(45) Date of Patent: Aug. 10, 2021

(54) CENTER FLOOR STRUCTURE FOR VEHICLE

(71) Applicants: HYUNDAI MOTOR COMPANY, Seoul (KR); KIA MOTORS CORPORATION, Seoul (KR)

(72) Inventors: Hyun Ahn, Seoul (KR); Jae Ha Shim, Seoul (KR); Hee Suk Chung, Hwaseong-si (KR); Young Ho Lee, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 49 days.

(21) Appl. No.: 16/655,896

(22) Filed: Oct. 17, 2019

(65) Prior Publication Data

US 2020/0324827 A1   Oct. 15, 2020

(30) Foreign Application Priority Data

Apr. 10, 2019   (KR) .................. 10-2019-0041962

(51) Int. Cl.
*B62D 25/20*   (2006.01)
*B60K 1/04*   (2019.01)

(52) U.S. Cl.
CPC .............. *B62D 25/20* (2013.01); *B60K 1/04* (2013.01); *B60K 2001/0438* (2013.01)

(58) Field of Classification Search
CPC ... B62D 25/20; B60K 1/04; B60K 2001/0438
See application file for complete search history.

(56) References Cited

U.S. PATENT DOCUMENTS

| | | | |
|---|---|---|---|
| 9,033,085 B1* | 5/2015 | Rawlinson | B60L 11/1877 180/68.5 |
| 2002/0145307 A1* | 10/2002 | Fujita | B60N 3/06 296/193.07 |
| 2012/0043147 A1* | 2/2012 | Milner | B62D 25/20 180/68.5 |
| 2013/0175829 A1* | 7/2013 | Kim | B60L 58/21 296/204 |
| 2013/0229030 A1* | 9/2013 | Yamaguchi | B60L 50/66 296/193.07 |
| 2017/0217296 A1* | 8/2017 | Nomura | B60R 19/02 |
| 2017/0267057 A1* | 9/2017 | Koyama | B60K 1/04 |
| 2018/0056768 A1* | 3/2018 | Fujiwara | B62D 25/20 |
| 2020/0324637 A1* | 10/2020 | Hammond, Jr. | B62D 25/20 |

FOREIGN PATENT DOCUMENTS

JP     2012-183858 A     9/2012

* cited by examiner

*Primary Examiner* — Brian L Swenson
(74) *Attorney, Agent, or Firm* — Morgan, Lewis & Bockius LLP

(57) ABSTRACT

A center floor structure for a vehicle, includes: a center floor panel having an opening, and a peripheral portion of the center floor panel defining the opening; and a battery assembly mounted under the center floor panel, and covering the opening of the center floor panel. The opening is defined in a central portion of the center floor panel, and the peripheral portion includes a plate structure.

6 Claims, 5 Drawing Sheets

CENTER FLOOR STRUCTURE FOR VEHICLE

CROSS-REFERENCE TO RELATED APPLICATION

This application is based on and claims the benefit of priority to Korean Patent Application No. 10-2019-0041962, filed on Apr. 10, 2019, in the Korean Intellectual Property Office, the disclosure of which is incorporated herein in its entirety by reference.

TECHNICAL FIELD

The present disclosure relates to a center floor structure for a vehicle, and more particularly, to a center floor structure for a vehicle which allows a battery upper case to be integrated into a center floor of a vehicle, thereby reducing the weight and manufacturing cost thereof.

BACKGROUND

Recently, as the perception of environmental crisis and depletion of oil resources has increased, research and development of eco-friendly electric vehicles have actively been conducted. Electric vehicles include a plug-in hybrid electric vehicle (PHEV), a battery electric vehicle (BEV), a fuel cell electric vehicle (FCEV), etc.

An electric vehicle is equipped with a high-voltage battery assembly which is mounted to a vehicle body. The high-voltage battery assembly includes one or more battery cells (or a battery module), electrical components associated with the battery cells, and a battery case in which the battery cells and the electrical components are mounted. The battery case includes a battery upper case and a battery lower case. The high-voltage battery assembly may be mounted under a center floor panel of the vehicle body, and thus the high-voltage battery assembly may be located under a passenger compartment.

The center floor panel provides sealing and NVH functions for the passenger compartment, and the battery case provides a sealing function for the battery.

The conventional electric vehicle is equipped with the high-voltage battery assembly which is mounted under the center floor panel, which may increase the weight and manufacturing cost of a center floor structure.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a center floor structure for a vehicle which allows a battery upper case to be integrated into a center floor of a vehicle, thereby reducing the weight and manufacturing cost thereof.

According to an aspect of the present disclosure, a center floor structure for a vehicle may include: a center floor panel having an opening, and a peripheral portion of the center floor structure defining the opening; and a battery assembly mounted under the center floor panel, and covering the opening of the center floor panel.

The opening may be defined in a central portion of the center floor panel, and the peripheral portion may include a plate structure.

The battery assembly may include a battery upper case facing the opening.

The center floor structure may further include a weather strip sealing a clearance between the battery upper case and a periphery of the opening.

The weather strip may include a base portion attached to a top surface of the battery upper case, a sealing profile extending upwardly from the base portion, and a lip portion extending upwardly from a top end of the sealing profile.

The sealing profile and the lip portion may be deformed by an external force.

The battery upper case may include a plurality of beads formed on a top surface thereof.

Each of the reinforcing beads may extend in an inclined direction with respect to a longitudinal axis of the battery upper case.

An edge of the opening may be recessed downwardly from the peripheral portion by a predetermined offset distance.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
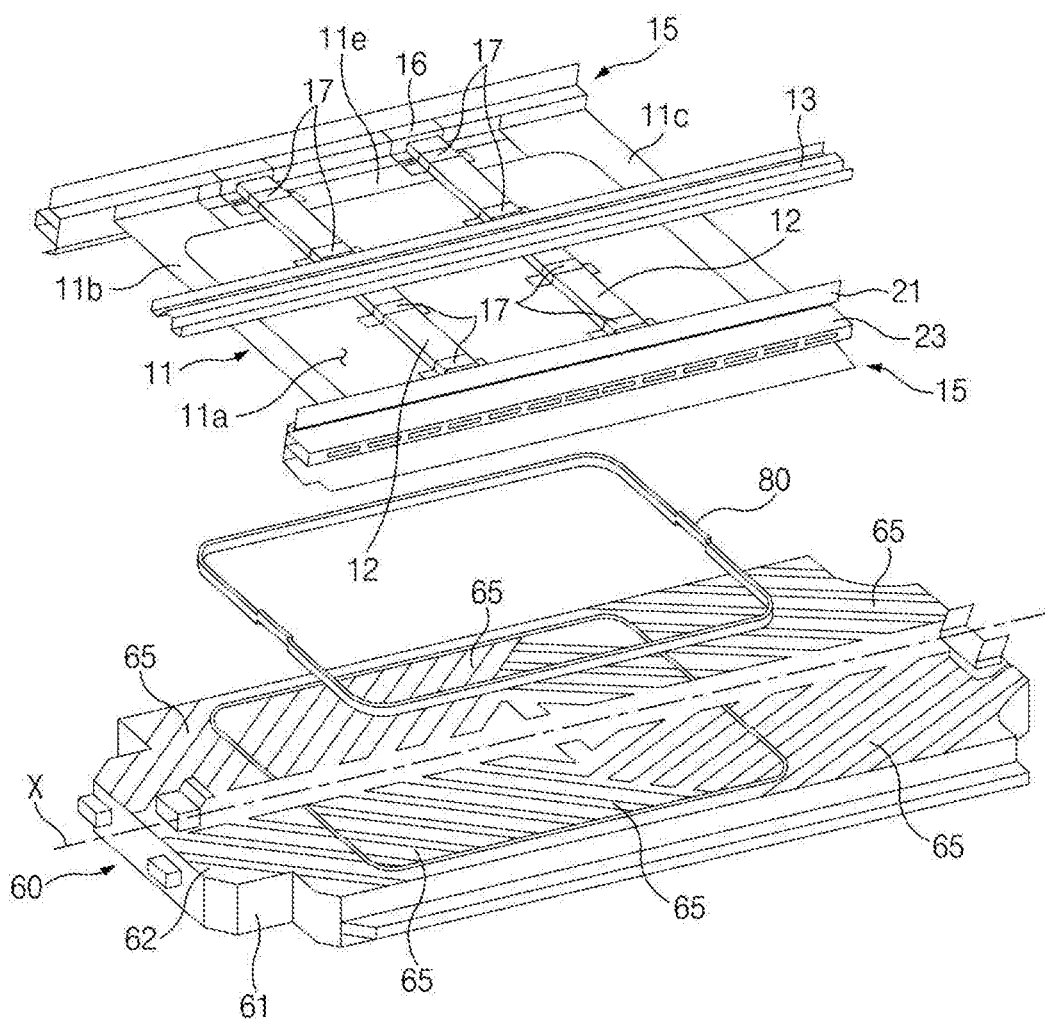
FIG. 1 illustrates an exploded perspective view of a center floor structure for a vehicle according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
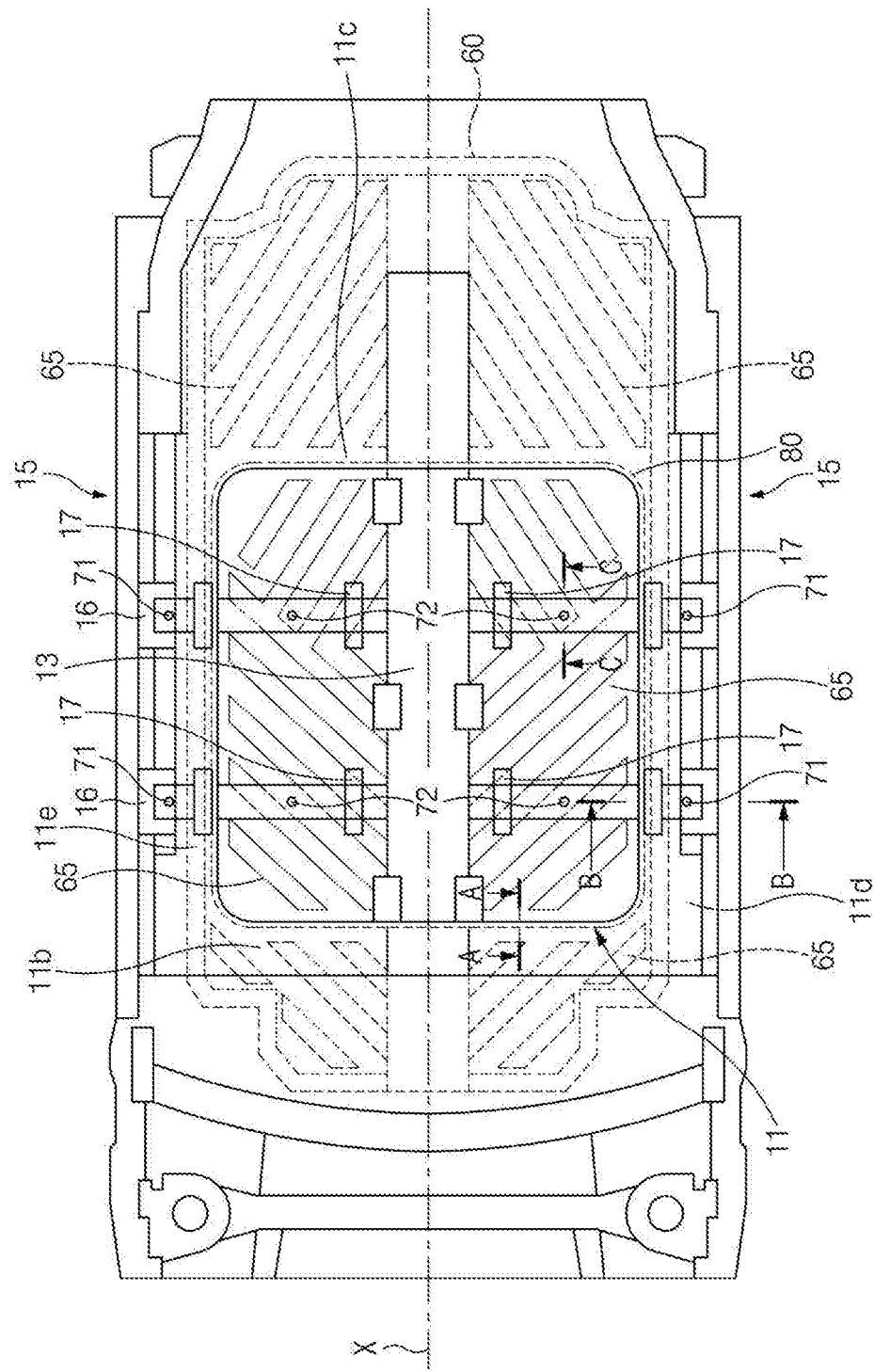
FIG. 2 illustrates a plan view of a center floor structure for a vehicle according to an exemplary embodiment of the present disclosure.

Referring to FIGS. 1 and 2, a center floor structure 10 for a vehicle, according to an exemplary embodiment of the present disclosure, may include a center floor panel 11 disposed in a lower portion of a vehicle body, and a battery assembly 60 mounted under the center floor panel 11.

The center floor panel 11 may be disposed in the lower portion of the vehicle body to form a floor of the vehicle. As illustrated in FIGS. 1 and 2, the center floor panel 11 may include an opening 11a formed in a central portion thereof, and a plurality of peripheral portions 11b, 11c, 11d, and 11e surrounding the opening 11a.

For example, the plurality of peripheral portions 11b, 11c, 11d, and 11e may include a front peripheral portion 11b facing the front of the vehicle, a rear peripheral portion 11c facing the rear of the vehicle, and a pair of side peripheral portions 11d and 11e facing both left and right sides of the vehicle. Each peripheral portion may be a plate structure. For example, each peripheral portion may be a flat plate structure.

The battery assembly 60 may be mounted under the center floor panel 11. In particular, the battery assembly 60 may be disposed to cover the opening 11a of the center floor panel 11 under the center floor panel 11. As the battery assembly 60 is disposed under the center floor panel 11 so as to cover the opening 11a of the center floor panel 11, the weight and manufacturing cost of the center floor panel 11 may be reduced.

The battery assembly 60 may be coupled to side sills 15 of the vehicle body and a front structure and a rear structure of the vehicle body by bolts and/or the like.

The battery assembly 60 may include one or more battery cells (or a battery module), electrical components associated with the battery cells, a battery lower case 61 in which the battery cells and the electrical components are mounted, and a battery upper case 62 covering the top of the battery lower case 61.

The battery upper case 62 may be located under the center floor panel 11, and a top surface of the battery upper case 62 may face the opening 11a of the center floor panel 11.

Figure 3:
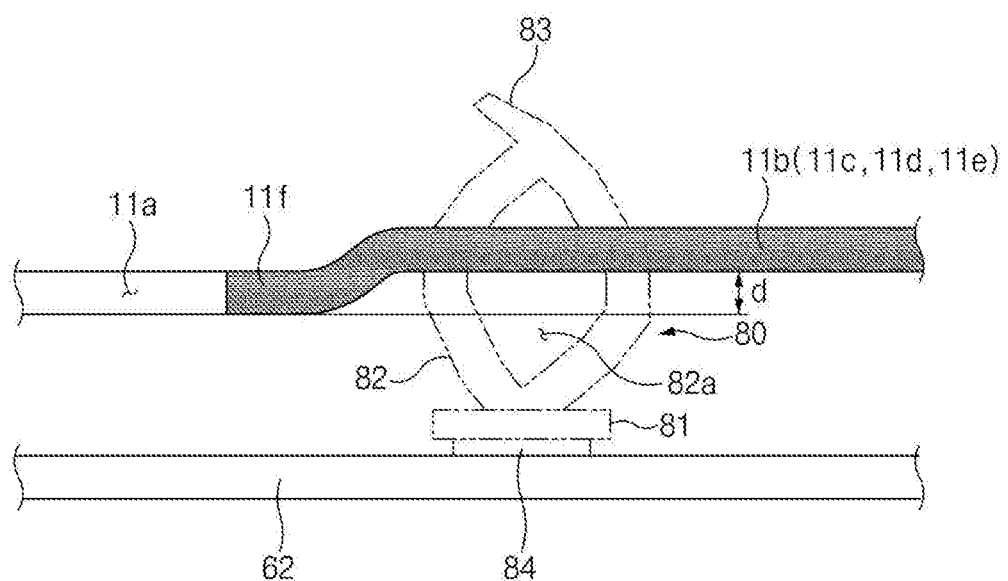
FIG. 3 illustrates a cross-sectional view taken along line A-A of FIG. 2.

Referring to FIGS. 1 to 3, the center floor structure 10 for a vehicle according to an exemplary embodiment of the present disclosure may include a weather strip 80 sealing a clearance between the battery upper case 62 and the periphery of the opening 11a of the center floor panel 11.

The weather strip 80 may include a base portion 81 attached to the top surface of the battery upper case 62, a sealing profile 82 extending upwardly from the base portion 81, and a lip portion 83 extending upwardly from a top end of the sealing profile 82. The base portion 81 may be directly attached to the top surface of the battery upper case 62 by an adhesive means such as double-sided tape 84. The sealing profile 82 may be deformed by an external force. In particular, the sealing profile 82 may have a cavity 82a formed therein. The lip portion 83 may be deformed by an external force. In particular, as the lip portion 83 is deformed by the force, the lip portion 83 may tightly contact a bottom surface of the center floor panel 11 around the periphery of the opening 11a.

When the battery assembly 60 is assembled into the vehicle body to cover the opening 11a of the center floor panel 11 under the center floor panel 11, the sealing profile 82 and the lip portion 83 of the weather strip 80 may be deformed (pressed) between the battery upper case 62 of the battery assembly 60 and the periphery of the opening 11a of the center floor panel 11 so that the sealing profile 82 and the lip portion 83 may tightly contact the bottom surface of the center floor panel 11 around the periphery of the opening 11a. In this manner, the weather strip 80 may seal the clearance between the periphery of the opening 11a of the center floor panel 11 and the battery upper case 62 of the battery assembly 60 so that sealability for a floor of a passenger compartment may be sufficiently secured. By employing the weather strip 80 which provides the sealing function by the pressing method, instead of the use of an adhesive sealing member such as a sealant, the replacement or repair of the battery assembly 60 may easily be performed.

A plurality of reinforcing beads 65 may be integrally formed on the top surface of the battery upper case 62 by various processing methods, and each reinforcing bead 65 may extend in an inclined direction with respect to a longitudinal axis X of the battery upper case 62. In other words, the reinforcing beads 65 may extend diagonally on the top surface of the battery upper case 62, thereby improving the overall torsional stiffness of the vehicle body including the battery upper case 62. In particular, the plurality of reinforcing beads 65 may be designed in a diamond pattern, capable of increasing the torsional stiffness, through topology analysis.

An edge 11f of the opening 11a may be recessed downwardly from each of the peripheral portions 11b, 11c, 11d, and 11e by a predetermined offset distance d, so that the edge 11f may be closer to the battery upper case 62 of the battery assembly 60 than the peripheral portions 11b, 11c, 11d, and 11e. As the edge 11f of the opening 11a is recessed from each of the peripheral portions 11b, 11c, 11d, and 11e, a contact area with the lip portion 83 of the weather strip 80 may increase, and the lip portion 83 may tightly contact the edge 11f of the opening 11a, so that the sealing performance of the weather strip 80 may be further improved.

According to the above-described exemplary embodiment of the present disclosure, the center floor panel 11 may have the opening 11a, thereby reducing the overall weight and manufacturing cost.

The center floor structure 10 for a vehicle according to an exemplary embodiment of the present disclosure may include a plurality of seat cross members 12 extending in a width direction of the vehicle, and a rail member 13 perpendicular to the plurality of seat cross members 12.

Figure 4:
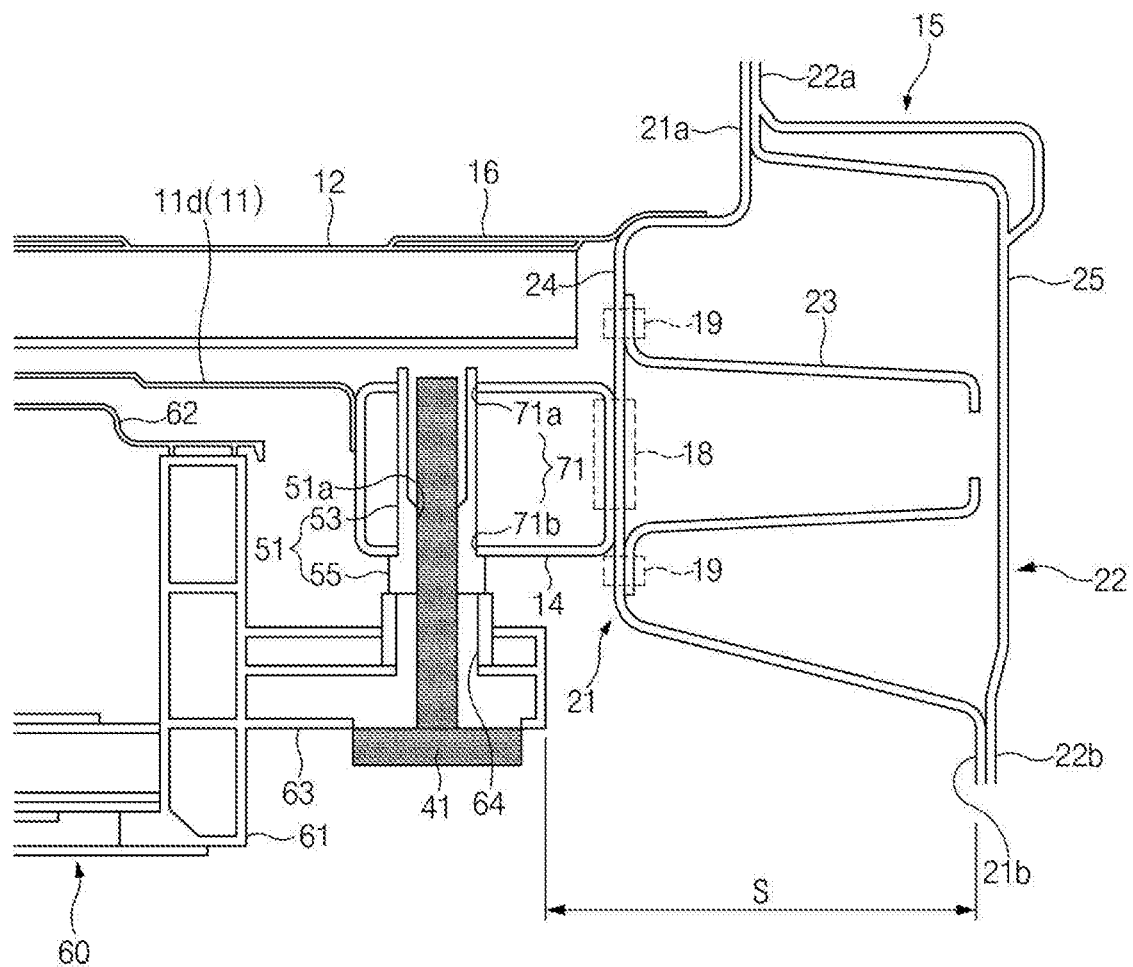
FIG. 4 illustrates a cross-sectional view taken along line B-B of FIG. 2.

As illustrated in FIGS. 1 and 2, the pair of side sills 15 may be connected to both left and right sides of the center floor panel 11, respectively. Referring to FIG. 4, each side sill 15 may include an inner side sill 21 and an outer side sill 22, and the inner side sill 21 and the outer side sill 22 may extend in a longitudinal direction of the vehicle. The inner side sill 21 may have a top flange 21a and a bottom flange 21b, and the outer side sill 22 may have a top flange 22a and a bottom flange 22b. The top flange 21a of the inner side sill 21 and the top flange 22a of the outer side sill 22 may be coupled by welding, using fasteners, and/or the like, and the bottom flange 21b of the inner side sill 21 and the bottom flange 22b of the outer side sill 22 may be coupled by welding, using fasteners, and/or the like. Each side sill 15 may have an inboard sidewall 24 facing the interior of the vehicle, and an outboard sidewall 25 facing the outside of the vehicle. The inboard sidewall 24 may be a sidewall of the inner side sill 15, and the outboard sidewall 25 may be a sidewall of the outer side sill 15.

Each side sill 15 may include an inner reinforcing member 23 mounted therein. The inner reinforcing member 23 may be an aluminum extruded product extending in the longitudinal direction of the vehicle. The inner reinforcing member 23 may be coupled to the inner side sill 21 by spot welding 19 and/or the like.

A pair of battery mounting beams 14 may be mounted on the pair of side sills 15, respectively. Each battery mounting beam 14 may extend in the longitudinal direction of the vehicle. The battery mounting beam 14 may be coupled to the inboard sidewall 24 of the side sill 15 by laser welding or laser screw welding (LSW) 18, and/or the like. The battery mounting beam 14 may have a tubular shape having a closed cross-section. For example, the battery mounting beam 14 may be a tube produced by roll forming, welding, and the like. As the battery mounting beam 14 is coupled to the inboard sidewall 24 of the side sill 15 by laser welding or laser screw welding (LSW), interference between components occurring during the assembly of the battery assembly may be prevented, so that the loading of the components may be carried out smoothly.

Referring to FIG. 4, the side peripheral portions 11d and 11e of the center floor panel 11 may be coupled to the battery mounting beams 14 by welding and/or the like, respectively. Each battery mounting beam 14 may have a plurality of first through holes 71. The plurality of first through holes 71 may be spaced apart from each other in a longitudinal direction of the battery mounting beam 14 so that the plurality of first through holes 71 may be arranged in the longitudinal direction of the vehicle. A first cylindrical nut 51 for mounting the battery assembly 60 may be coupled to each first through hole 71 by welding and/or the like.

Each first through hole 71 may extend in a height direction of the vehicle. Each first through hole 71 may define a first upper opening 71a and a first lower opening 71b in the battery mounting beam 14. The first upper opening 71a may be formed in a top surface of the battery mounting beam 14, and the first lower opening 71b may be formed in a bottom surface of the battery mounting beam 14. The first cylindrical nut 51 may have a hollow cylindrical shape, and a first female thread (internal thread) 51a to which a first bolt 41 is screwed may be formed on the inside of the first cylindrical nut 51. The first cylindrical nut 51 may include a first cylindrical portion 53 passing through the first through hole 71 of the battery mounting beam 14, and a first head portion 55 formed on a bottom end of the first cylindrical portion 53. The first cylindrical portion 53 may extend in the height direction of the vehicle. A top end of the first cylindrical portion 53 may be coupled to the first upper opening 71a of the first through hole 71 by welding and/or the like, and the bottom end of the first cylindrical portion 53 may be coupled to the first lower opening 71b of the first through hole 71 by welding and/or the like. The first head portion 55 may be coupled to the bottom surface of the battery mounting beam 14 adjacent to the first lower opening 71b by welding and/or the like. As the first cylindrical nut 51 is coupled to the battery mounting beam 14, the battery mounting beam 14 may obtain enough stiffness in a portion thereof to which the first bolt 41 is fastened. Compared to the related art, stiffness may be secured and durability may be improved, which enables an increase in the weight of the battery assembly 60, contributing to an increase in the range of an electric vehicle.

The plurality of seat cross members 12 may be disposed on the center floor panel 11, and both ends of each seat cross member 12 may be individually coupled to the pair of side sills 15. As illustrated in FIGS. 1 and 2, as both ends of each seat cross member 12 are coupled to the pair of side sills 15 through end joints 16, respectively, each seat cross member 12 may connect between the pair of side sills 15 in the width direction of the vehicle. The seat cross member 12 may have a tubular shape having a closed cross-section, and a plurality of mounting brackets 17 may be coupled to an outer surface of the seat cross member 12. A seat rail (not shown) of a vehicle seat may be mounted on the plurality of mounting brackets 17.

The rail member 13 may extend in the longitudinal direction of the vehicle, and the rail member 13 may be mounted across the plurality of seat cross members 12 along a center line of the vehicle body. A center console (not shown) may be mounted on the rail member 13. For example, in an electric vehicle, the center console may be mounted to move along the rail member 13 in the longitudinal direction of the vehicle.

The rail member 13 may extend in the longitudinal direction of the vehicle, and the seat cross member 12 and the rail member 13 may be perpendicular to each other. For example, the rail member 13 may be coupled to top surfaces of the plurality of seat cross members 12 by laser screw welding (LSW) and/or the like. Alternatively, the plurality of seat cross members 12 may be configured to pass through the rail member 13.

The battery lower case 61 may have a pair of side mountings 63 provided on both sides thereof, respectively, and each side mounting 63 may extend toward the adjacent side sill 15. Each side mounting 63 may have a through hole 64 through which the first bolt 41 passes. As the first bolt 41 passes through the through hole 64 of the side mounting 63 and is fastened to the first cylindrical nut 51 of the battery mounting beam 14, the side mounting 63 may be coupled to the battery mounting beam 14.

As the battery mounting beam 14 is coupled to the inboard sidewall 24 of the side sill 15, a space S between the outboard sidewall 25 of the side sill 15 and the side mounting 63 of the battery assembly 60 may be sufficiently secured. Thus, a space for impact absorption during a side impact may be sufficiently secured, so that deformation of a high-voltage battery assembly may be prevented during the side impact.

Figure 5:
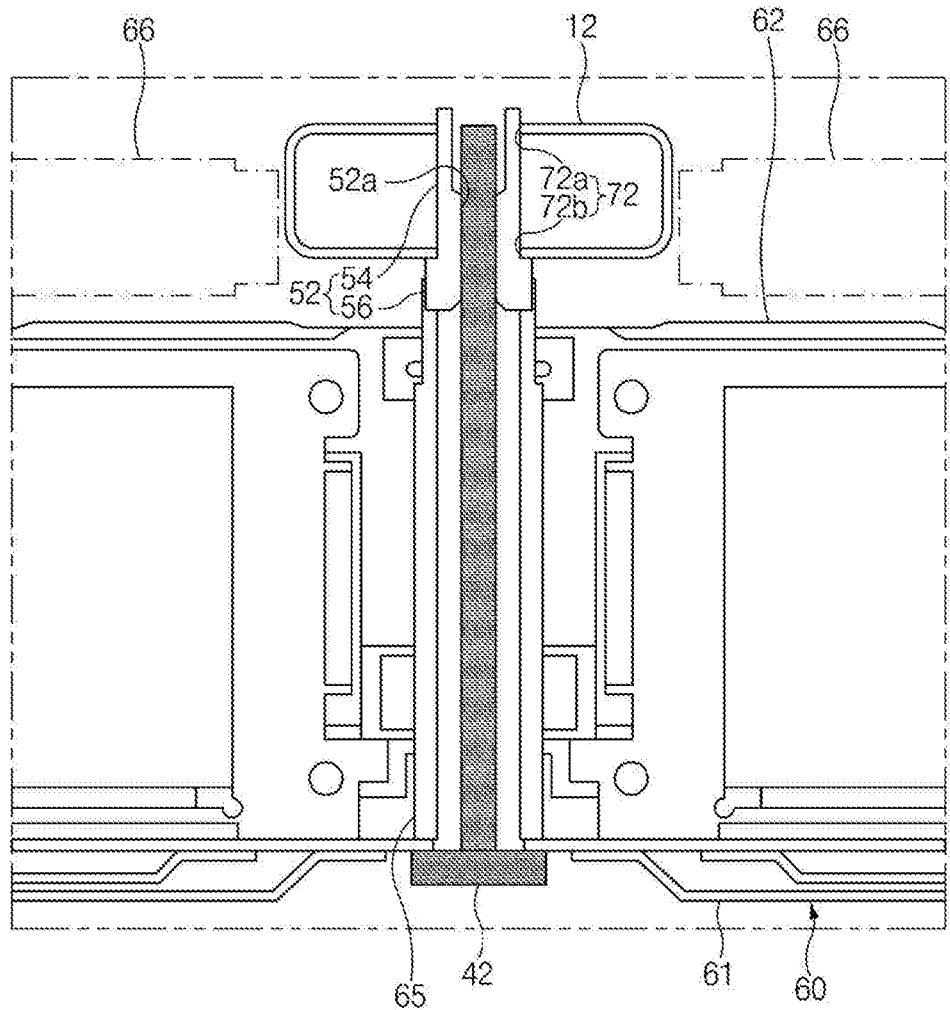
FIG. 5 illustrates a cross-sectional view taken along line C-C of FIG. 2.

Referring to FIG. 5, the seat cross member 12 may have a plurality of second through holes 72. The plurality of second through holes 72 may be spaced apart from each other in a longitudinal direction of the seat cross member 12 so that the plurality of second through holes 72 may be arranged in the width direction of the vehicle.

A second cylindrical nut 52 for mounting the battery assembly 60 may be coupled to each second through hole 72 by welding and/or the like. Each second through hole 72 may extend in the height direction of the vehicle. Each second through hole 72 may define a second upper opening 72a and a second lower opening 72b in the seat cross member 12. The second upper opening 72a may be formed in a top surface of the seat cross member 12, and the second lower opening 72b may be formed in a bottom surface of the seat cross member 12. The second cylindrical nut 52 may have a hollow cylindrical shape, and a second female thread (internal thread) 52a to which a second bolt 42 is screwed may be formed on the inside of the second cylindrical nut 52. The second cylindrical nut 52 may include a second cylindrical portion 54 passing through the second through hole 72 of the seat cross member 12, and a second head portion 56 formed on a bottom end of the second cylindrical portion 54. The second cylindrical portion 54 may extend in the height direction of the vehicle. A top end of the second cylindrical portion 54 may be coupled to the second upper opening 72a of the second through hole 72 by welding and/or the like, and a bottom end of the second cylindrical portion 54 may be coupled to the second lower opening 72b of the second through hole 72 by welding and/or the like. The second head portion 56 may be coupled to the bottom surface of the seat cross member 12 adjacent to the second lower opening 72*b* of the second through hole 72 by welding and/or the like. As the second cylindrical nut 52 is coupled to the seat cross member 12, the seat cross member 12 may obtain enough stiffness in a portion thereof to which the second bolt 42 is fastened.

Compared to the related art, stiffness may be secured and durability may be improved, which enables an increase in the weight of the battery assembly 60, contributing to an increase in the range of the electric vehicle.

The battery assembly 60 may have a plurality of sleeves 65 mounted therein. Each sleeve 65 may extend in a vertical direction, and the second bolt 42 may pass through each sleeve 65. As the second bolt 42 passes through the sleeve 65 of the battery assembly 60 and is fastened to the second female thread 52*a* of the second cylindrical nut 52 of the seat cross member 12, the battery assembly 60 may be coupled to the seat cross member 12.

The side mounting 63 of the battery assembly 60 may be coupled to the side sill 15 through the first bolt 41 and the first cylindrical nut 51, and the sleeve 65 of the battery assembly 60 may be coupled to the seat cross member 12 through the second bolt 42 and the second cylindrical nut 52, so that the battery assembly 60 may be mounted to the battery mounting beam 14.

Referring to FIG. 5, a space among the seat cross member 12, the rail member 13, and the side sill 15 may be filled with a plurality of fillers 66 so that a flat floor structure may be formed. The fillers 66 may be made of a material capable of improving impact performance and sound insulation performance, such as pads and honeycomb panels, and the fillers 66 may protect passengers and the battery safely.

As set forth above, according to exemplary embodiments of the present disclosure, the battery assembly may be disposed under the center floor panel so as to cover the opening of the center floor panel so that the weight and manufacturing cost of the center floor panel may be reduced.

According to exemplary embodiments of the present disclosure, the weather strip may seal the clearance between the periphery of the opening of the center floor panel and the battery upper case of the battery assembly so that sealability for the floor of the passenger compartment may be sufficiently secured. In particular, as the weather strip provides the sealing function between the center floor panel and the battery assembly by the pressing method, the replacement or repair of the battery assembly may be performed more easily compared to the use of a conventional adhesive sealing member.

According to exemplary embodiments of the present disclosure, the plurality of reinforcing beads may be formed on the top surface of the battery upper case of the battery assembly, thereby improving the overall torsional stiffness of the vehicle body including the battery upper case.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A center floor structure for a vehicle, the center floor structure comprising:
 a center floor panel having an opening, and a peripheral portion of the center floor panel defining the opening;
 a battery assembly mounted under the center floor panel, and covering the opening of the center floor panel; and
 a weather strip sealing a clearance between the battery assembly and a periphery of the opening,
 wherein the weather strip includes a base portion attached to a top surface of the battery assembly, a sealing profile extending upwardly from the base portion, and a lip portion extending upwardly from a top end of the sealing profile, and
 wherein the sealing profile and the lip portion are configured to be deformed by an external force.

2. The center floor structure according to claim 1, wherein the opening is defined in a central portion of the center floor panel, and
 the peripheral portion includes a plate structure.

3. The center floor structure according to claim 1, wherein the battery assembly includes a battery upper case facing the opening.

4. The center floor structure according to claim 3, wherein the battery upper case includes a plurality of beads formed on a top surface of the battery upper case.

5. The center floor structure according to claim 4, wherein each of the reinforcing beads extends in an inclined direction with respect to a longitudinal axis of the battery upper case.

6. The center floor structure according to claim 1, wherein an edge of the opening is recessed downwardly from the peripheral portion by a predetermined offset distance.

\* \* \* \* \*